(12) United States Patent
Sherwood et al.

(10) Patent No.: US 9,042,552 B2
(45) Date of Patent: May 26, 2015

(54) MANAGING ENCRYPTION KEYS IN A COMPUTER SYSTEM

(71) Applicant: International Business Machines Corporation, Armonk, NY (US)

(72) Inventors: David Sherwood, Manchester (GB); James William Walker, Manchester (GB); Travis Walton, Manchester (GB)

(73) Assignee: International Business Machines Corporation, Armonk, NY (US)

(*) Notice: Subject to any disclaimer, the term of this patent is extended or adjusted under 35 U.S.C. 154(b) by 64 days.

(21) Appl. No.: 13/803,468

(22) Filed: Mar. 14, 2013

(65) Prior Publication Data
US 2013/0243197 A1    Sep. 19, 2013

(30) Foreign Application Priority Data
Mar. 14, 2012    (GB) .................................. 1204427.7

(51) Int. Cl.
*H04L 9/14* (2006.01)
*H04L 9/08* (2006.01)

(52) U.S. Cl.
CPC ................ *H04L 9/08* (2013.01); *H04L 9/0891* (2013.01)

(58) Field of Classification Search
CPC ................................ H04L 9/08; H04L 9/0891
See application file for complete search history.

(56) References Cited

U.S. PATENT DOCUMENTS

| 4,972,472 | A | 11/1990 | Brown et al. |
| 5,982,891 | A | 11/1999 | Ginter et al. |
| 8,625,803 | B1* | 1/2014 | Radhakrishnan et al. .... 380/279 |
| 2004/0081320 | A1 | 4/2004 | Jordan et al. |
| 2006/0133614 | A1* | 6/2006 | Zhang et al. ................... 380/273 |
| 2010/0091993 | A1 | 4/2010 | Iwama |
| 2010/0208898 | A1 | 8/2010 | Acar et al. |
| 2011/0113259 | A1 | 5/2011 | Bilodi et al. |
| 2011/0246784 | A1 | 10/2011 | Hobbett et al. |
| 2012/0170751 | A1* | 7/2012 | Wurm ........................... 380/278 |

FOREIGN PATENT DOCUMENTS

WO    0135226 A1    5/2001

* cited by examiner

*Primary Examiner* — Jung Kim
*Assistant Examiner* — Robert Leung
(74) *Attorney, Agent, or Firm* — Roy W. Truelson

(57) ABSTRACT

A method and apparatus is disclosed for managing encryption keys in a computer system in which in response to the change of a system key the old key and new key are both maintained for subsequent use.

12 Claims, 6 Drawing Sheets

| Key Number | Key Hash (SHA-1) | Key (128 bit) |
| --- | --- | --- |
| 1 | ec2e2d2784673df5f04949b859af3604a3acac7 | 28754e26292e5c79616a6e5165 |
| 2 | af9399bc448a5de4948f2d2843af0ced4452554 | 4e53693374b54643f493f436a |
| 3 | 5bc5b352bc10369f6df72f0ee6e21c4a923ca69f | 6a447e2434286226313474585f |

Figure 3

MANAGING ENCRYPTION KEYS IN A COMPUTER SYSTEM

BACKGROUND

1. Field of Invention

The present invention relates to managing encryption keys in a computer system.

2. Background of the Invention

Computer systems are commonly implemented as virtual machines. A virtual machine (VM) is a software implementation of a computer that provides an operating system or executes application programs as if it were a physical machine. VMs are commonly provided on a physical machine by a virtual machine environment (VME) application program, which provides a user interface for managing the provided VMs.

As with any computer system some of the associated data may need to be stored securely and is thus encrypted when not in use. Encryption and decryption is performed using an encryption key. Access to the encryption key is controlled so as to be limited to predetermined users or processes. In a VME, system encryption keys may be provided for encrypting data within the VME such as data in any of the VMs or the VM system data itself. System encryption keys may be changed by any user with suitable security access. The change of the system encryption key in a VME commonly triggers a process of re-encryption of all encrypted data in the VME with the new system key. Re-encryption using the new system key is therefore only possible when data is locked so that it cannot be accessed, that is, the encrypted data is guaranteed not to be in use.

VMs may be migrated between VMEs on different physical computers via a network connection connecting the relevant source and target computers. During migrations secure data is encrypted using the system encryption key of the VME on the source computer before being communicated to the target machine and decrypted using the system encryption key of the VME on the target computer.

In order for the migration to be successful, the system encryption key must be the same at both the source and target computers. Therefore, system key changes during migration or prior to decryption of migrated encrypted data are not allowed. In other words, migrations and key changes are not allowed to co-exist. Since migrations can be long processes, the inability for these processes to be performed concurrently is a significant problem in such computer systems.

SUMMARY

An embodiment of the invention provides a method for managing encryption keys in a computer system, the method comprising the steps of:
 storing a first key for encrypting data for a selected domain;
 storing a second key for the domain in addition to the first key in response to a key change for the domain; and
 providing the first key or the second key in response to a request for an encryption key for the domain.

One of the keys may be provided in response to a first request and the other the key is provided in response to a subsequent associated request for an encryption key for the domain. Keys may be provided in response to any set of one or more associated requests in the reverse order to which the keys were created. All the keys may be provided in response to the request. Keys may be maintained up to a predetermined maximum number after which the oldest key is discarded in response to the storing of a new key. A record of key usage may be maintained and the oldest unused key is discarded in response to the storing of a new key.

The keys may be maintained in a key history for the domain. The key history may comprise a list of the keys ranked in the order in which the keys were created. The domain may be a physical computer system. The domain may comprise a virtual machine comprising data encrypted using a selected one of the keys. Migration of the virtual machine to a target domain may only be performed if the selected key is available in the target domain. The keys may be ranked and the ranking of the selected key for the virtual machine is provided to the target domain for identification of the key in the target domain. The ranking may be arranged for use in the target domain for identifying the selected key from a set of keys for the target domain for decryption of the encrypted data. If the ranking fails to identify the selected key then successive keys from the set of keys for the target domain may be checked to identify the selected key.

Another embodiment provides apparatus for managing encryption keys in a computer system, the apparatus being operable to:
 store a first key for encrypting data for a selected domain;
 store a second key for the domain in addition to the first key in response to a key change for the domain; and
 to provide the first key or the second key in response to a request for an encryption key for the domain.

A further embodiment provides a computer program stored on a computer readable medium and loadable into the internal memory of a computer, comprising software code portions arranged, when the program is run on a computer, for performing a method for managing encryption keys in a computer system, the method comprising the steps of:
 storing a first key for encrypting data for a selected domain;
 storing a second key for the domain in addition to the first key in response to a key change for the domain; and
 providing the first key or the second key in response to a request for an encryption key for the domain.

BRIEF DESCRIPTION OF THE DRAWINGS

Embodiments of the invention will now be described, by way of example only, with reference to the accompanying drawings in which:

FIG. 3 is a table illustrating a set of encryption keys in the VMEs of FIG. 1;

DETAILED DESCRIPTION

Figure 1:
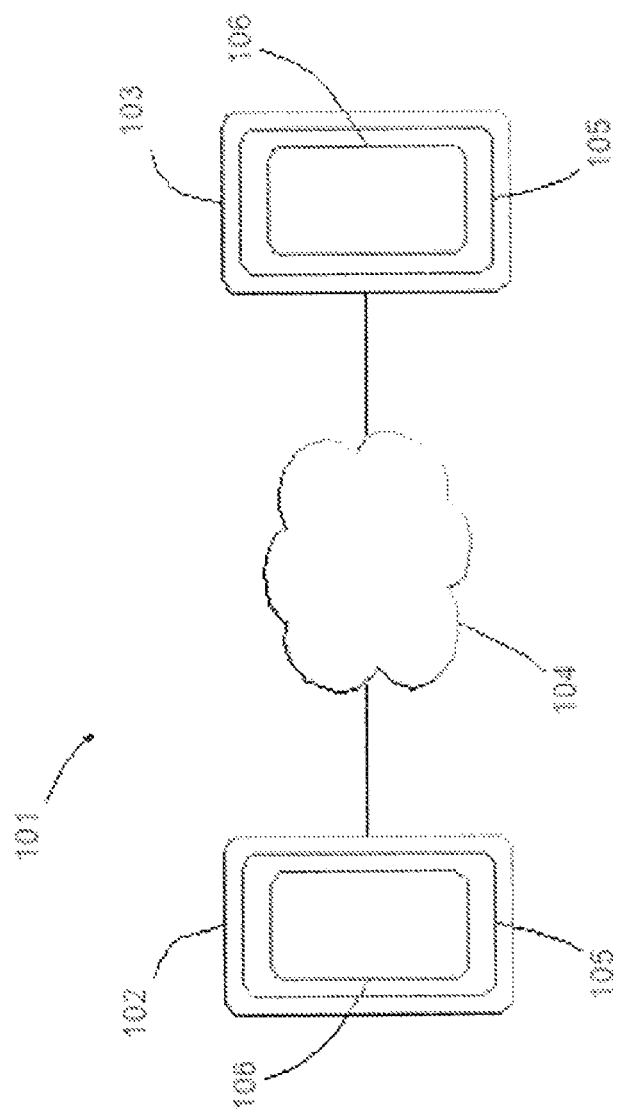
FIG. 1 is a schematic illustration of a networked computer system comprising computers provided with virtual machine environments (VMEs)

With reference to FIG. 1, a computer system 101 comprises a first and second computers 102, 103 interconnected via a network 104. Each of the computers 102, 103 is provided with an operating system 105, which provides a platform for running one or more application programs. In the present embodiment, each of the computers 102, 103 is loaded with a virtual machine environment (VME) application program 106, in the form of a hypervisor, arranged to provide one or more virtual machines (VMs) on each of the computers 102, 103.

Figure 2:
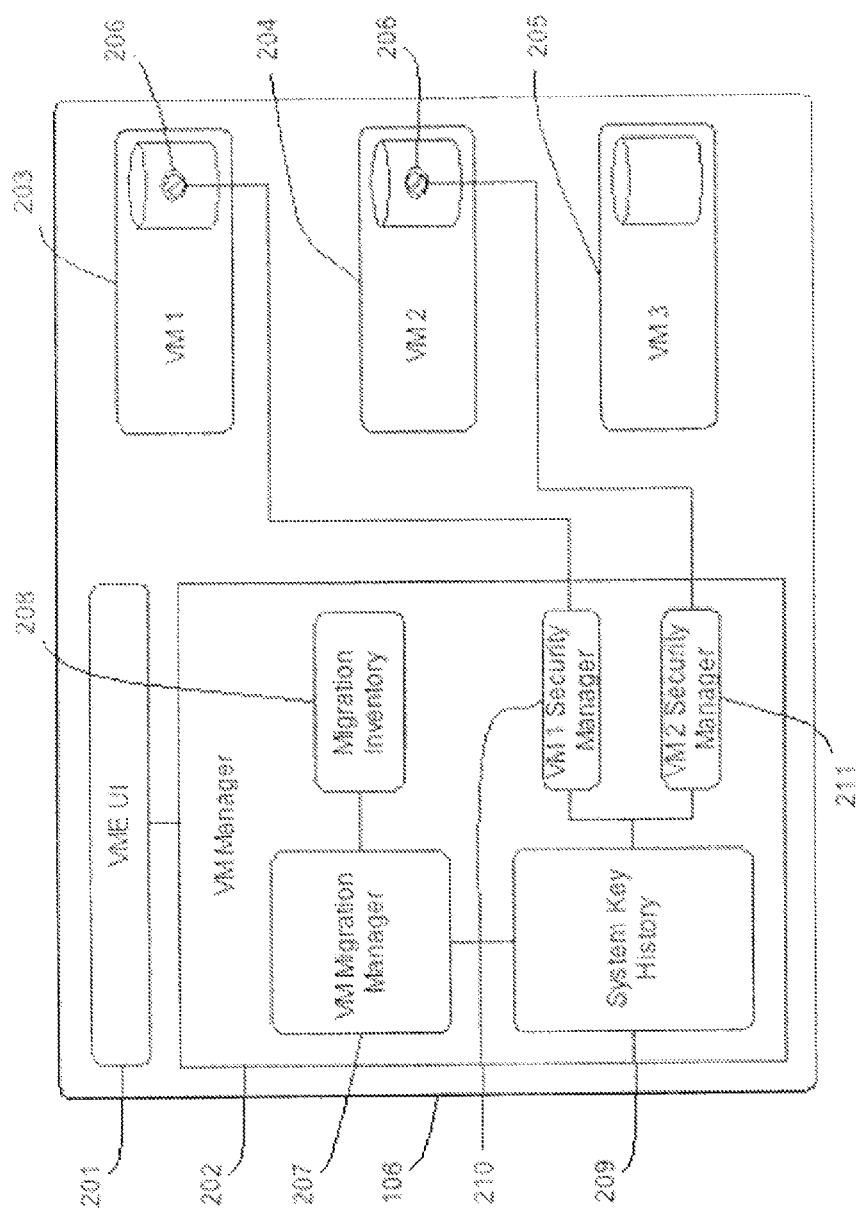
FIG. 2 is a schematic illustration of components of the virtual machine environment (VME) on one of the computers in the system of FIG. 1.

With reference to FIG. 2, the VME 106 comprises a VME user interface (VME UI) module 201 and a VM manager module 202. The VME UI 201 is arranged to provide user control of the VME 106. The VM manager module 202 is arranged to manage the creation and operation of one or more VMs 203, 204 205. In the present embodiment, two of the VMs (VM1, VM2) 203, 204 comprise secure data 206. The VM manager module 202 comprises a VM migration manager 207, a migration inventory 208, a system key history 209 and two instances of a secure data manager module 210, 211 each corresponding to one of the VMs (VM1, VM2) 203, 204 that comprise secure data 206.

The VM migration manager 207 is operable in response to an instruction from a user via the VME UI 201 to migrate a selected one of the VMs 203, 204, 205 from its source domain, that is, the VME 106 on the first computer 102 to a target domain, such as the VME 106 on the second computer 103. In response to such an instruction, the VM migration manager 207 builds the migration inventory 208 identifying the data and resources relevant to the VM to be migrated to the target domain. The VM migration manager 207 is also arranged to ensure that the target domain comprises the necessary resources to support the migrated VM.

The system key history 209 is maintained by the VME 106 and comprises encryption keys for encrypting and decrypting the secure data 206. In the present embodiment, when a domain encryption key is changed in response to a user input, both the new and the old keys are maintained in the system key history 209. Thus, a predetermined number of old keys remain available for encrypting and decrypting the secure data 206 even once a new encryption key has been provided. The system key history 209 will be described further below with reference to FIG. 3.

The secure data manager modules 210, 211 are arranged to provide access to the secure data 206 for permitted processes. The secure data manager modules 210, 211 receive requests to access the secure data 206 and, if the requesting process is authorised, decrypt the secure data 206 using a key from the system key history 209 and provide the decrypted secure data 206 to the requestor. In the present embodiment, the VM migration manager 207 is permitted to access the secure data 206 to enable it to migrate the corresponding VMs 203, 204. A secure data manager module 210, 211 is provided for each of the VMs 203, 204 that comprise secure data 206. No secure data manager module is provided for the third VM 205 that does not comprise secure data.

With reference to FIG. 3, in the present embodiment, the system key history 209 comprises an ordered list of entries, each entry storing a 128-bit encryption key 301 and a key hash 302. The key hash 302 is produced from the corresponding encryption key 301 by the SHA-1 hashing algorithm. Each entry further comprises a key number 303, which, in the present embodiment, indicates the relative position of the entry in the system key history 209. In the present embodiment, the entries are stored in the system key history 209 in the order in which they were created. The first encryption key 301 is assigned key number 1 and for each subsequent key the corresponding key number 303 is incremented. In other words, the newest key 301 will have the highest key number 303. In the present embodiment, the system key history 209 has a maximum of three entries. Thus, once the system key history 209 comprises three entries, each subsequent key change results in the oldest entry being removed from the system key history 209.

In the present embodiment, the key hash 303 is used by the VM migration manager 207 to check that the target domain of any given migration has the same encryption key available. The key hash 303 enables the corresponding encryption key to be identified without having to expose the encryption key 301 itself to non-secure environment such as the network 104.

In the present embodiment, the key number 303 is used by the VM migration manager 207 when performing a migration to indicate to the target VME 106 which entry in the source system key history 209 was used to encrypt the relevant secure data 206. If the source and target system key histories 209 correspond then the use of the key number 303 as described avoids the target VME 106 having to perform a search of its system key history for the correct encryption key to decrypt the received secure data 206.

Figure 4:
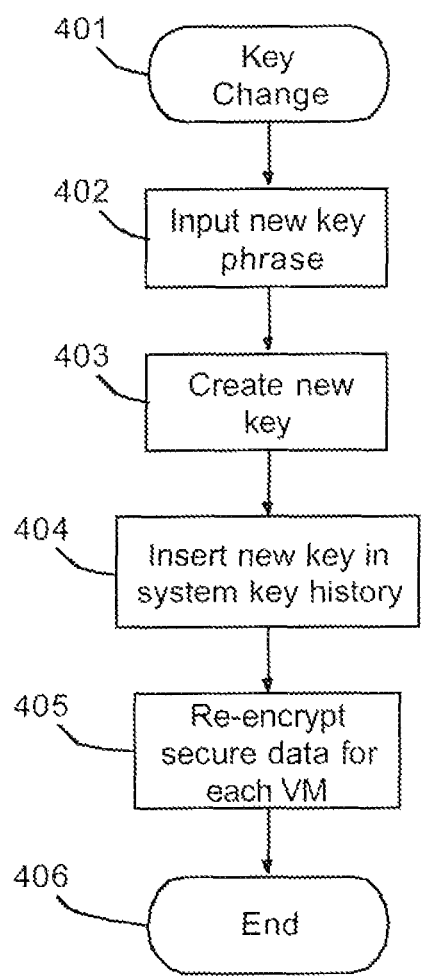
FIG. 4 is a flow chart illustrating the processing performed in one of the VMEs when changing an encryption key in the computer system of FIG. 1.

The processing performed by the VME 106 when changing encryption keys for the relevant system or domain will now be described further with reference to the flow chart of FIG. 4. Processing is initiated at step 401 in response to a user command and processing moves to step 402. At step 402 the user inputs the new key phrase and processing moves to step 403. At step 403 the new key is created from the input key phrase in accordance with an associated algorithm and processing moves to step 404. At step 404 the new key is inserted at the first free entry. If the encryption key history 209 was full prior to the arrival of the new key the oldest key having key number 1 is deleted and the remaining entries shifted to provide space for the new key. Processing then moves to step 405 where data encrypted under any old key, that is, any key in the encryption key history 209 apart from the newly inserted key, is marked for re-encryption with the new key. Re-encryption of such data is performed by an existing background process in VME 106 and takes place when the relevant data is not in use. Processing then moves to step 406 and ends.

Figure 5:
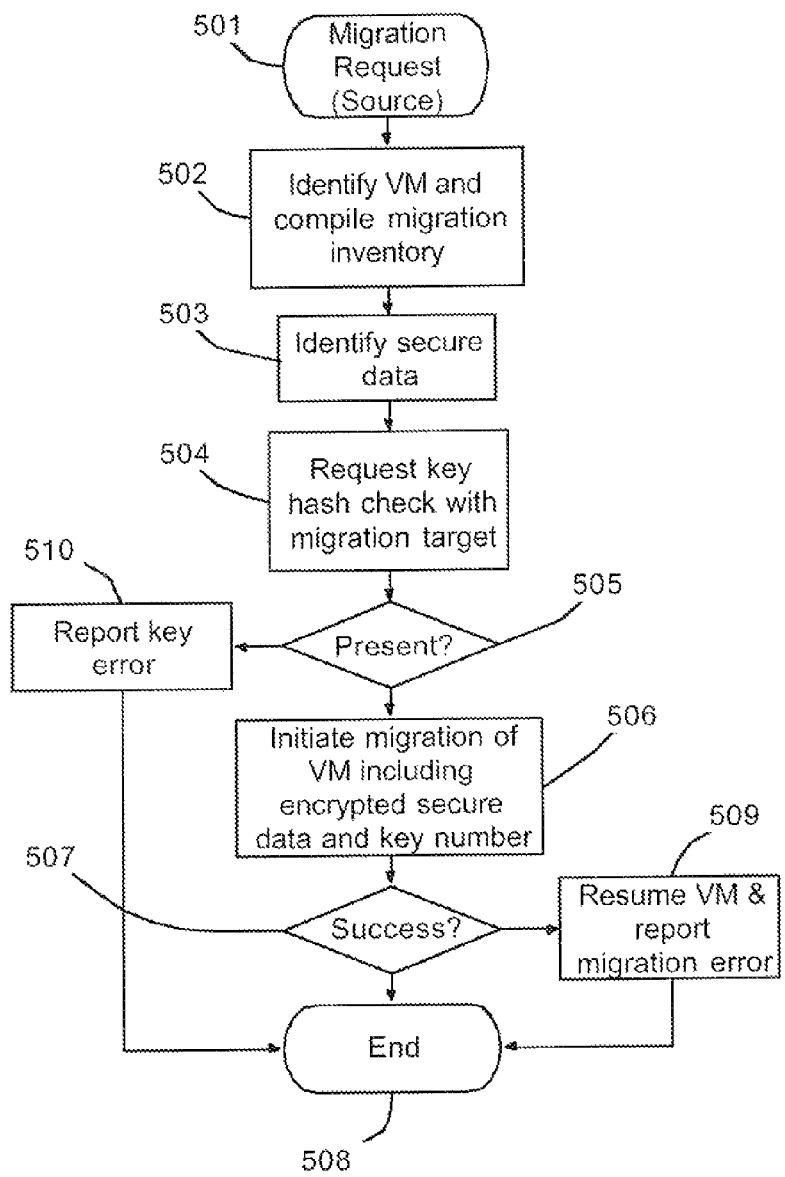
FIGS. 5 and 6 are flow charts illustrating the processing performed in the VMEs of FIG. 1 when migrating virtual machines between computers.

The processing performed by a VME 106 when migrating a VM from a source domain to a target domain will now be described further with reference to the flow chart of FIG. 5. Processing is initiated at step 501 in response to a user instruction and processing moves to step 502. At step 502 the VM to be migrated is identified and a migration inventory 208 compiled and processing moves to step 503. At step 503 the migration inventory 208 is used to identify secure data 206 in the VM and processing moves to step 504. At step 504 the encryption key 301 for the secure data is identified, the corresponding key hash 302 retrieved from the system key history 209 which is then used to request if the same encryption key is present in the target VME 106 key history. Processing then moves to step 505 where if the target 106 VME 106 indicates that the key 301 is present then processing moves to step 506. At step 506 the migration of the VM is initiated including the encrypted secure data accompanied by the key number 303 corresponding to its encryption key 301 and processing moves to step 507. At step 507 if the migration is successful then processing moves to step 508 and ends. If at step 508 the migration has failed then processing moves to step 509 where the VM is resumed or reinstated on the source VME 106 with processing then moving to step 508 and ending. If at step 505 the target VME 106 indicates that the key 301 is not present processing moves to step 510 to report a key error and then moves to step 508 and ends.

Figure 6:
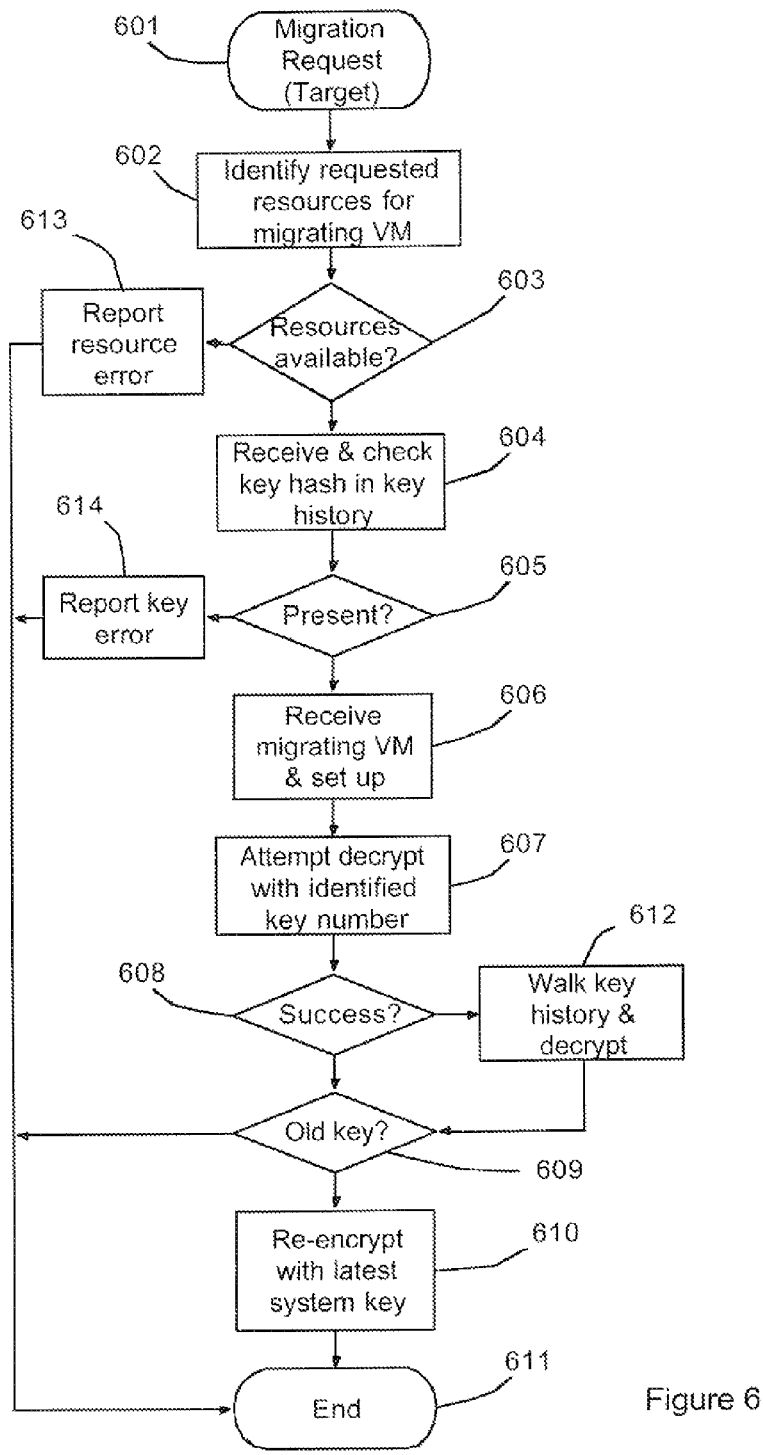

The processing performed by a VME 106 in a target domain when receiving a migrating VM from a source domain will now be described further with reference to the flow chart of FIG. 6. Processing is initiated at step 601 in response to the receipt of a migration request from a target domain and processing moves to step 602. At step 602 the required resources indicated in the migration request are identified in the target domain and processing moves to step 603. If at step 603 the relevant resources are identified as available then processing moves to step 604. At step 604 a key hash 302 is received and checked against the system key history 209 and processing moves to step 605. If at step 605 the key hash 302 is present in the system key history 209 this is reported to the source VME 106 and processing moves to step 606. At step 606 the migrating VM is received and set up in the target domain and processing moves to step 607. At step 607 the key number 303 provided with the migrating VM is used to index the domain system key history 209 to identify a suitable decryption key for the secure data 206 in the migrating VM and processing then moves to step 608. At step 608 if the decryption with the key indexed by the provided key number 303 was successful then processing moves to step 609. At step 609 if the key was an old key, then processing moves to step 610. At step 610 the decrypted data is marked for re-encryption with the latest system key and processing moves to step 611 and ends.

If at step 609 if the key was the latest key then processing moves to step 611 and ends. If at step 608 the decryption with the key 301 indexed by the provided key number 303 was not successful then processing moves to step 612. At step 612 decryption of the secure data 206 is attempted with each of the remaining untried keys 301 in the key history 209 in turn until the correct key is identified and processing then moves to step 609 and proceeds as described above. If at step 603 the relevant resources are not available then processing moves to step 613 where a resource error is reported to the VME 106 in the source domain and processing then moves to step 611 and ends. If at step 604 the key hash 302 is not present in the system key history 209 then processing moves to step 614 where a key error is reported to the source VME 106. Processing then moves to step 611 and ends.

Embodiments of the invention enable a VME or hypervisor to allow an encryption key to be changed at any time since one or more old keys are preserved for a period of time in the key history. As will be understood by those skilled in the art, a system key change normally results in the identification of data encrypted with an old key and the organised re-encryption of this data with the new key. Normally, some operations on such data, such as migration, would be barred until it had been re-encrypted. The functionality of the present invention enables such operations to be performed simultaneously. If for example a key change occurs during a migration, regardless of whether migrated data is encrypted using the new key or the old key, the old key is likely to be maintained in the key history so as to enable the subsequent decryption of the migrated data. In embodiments of the invention, during any given migration, key changes may occur in the source domain or the target domain or both without disabling the ability in either domain to decrypt the relevant data.

For example, a user may change the key on a source system A whilst a migration is taking place from system A to a target system B. A user may also initiate a migration of a virtual machine from system A to system B whilst a key change is in progress on B. A user may also initiate a migration of a virtual machine from system A to system B whilst a key change is in progress on A. As part of the key change on system A the hypervisor will re-encrypt all of the virtual machine's data and maintain knowledge of those successfully re-encrypted. As such the hypervisor will have a record of which virtual machine is using which key and may be arranged to either a) not bother re-encrypting the migrating virtual machine's data and migrate based on the old key, or b) migrate the virtual machine with the new key after successful re-encryption. In any of the above cases the migration will only be allowed if both systems A and B contain the same key in their history that was used to encrypt the migrated virtual machine's data.

In another embodiment of the invention an encryption key history is provided for use when VMs with secure data are hibernated, that is, when VMs are migrated from an active system to a storage device and vice-versa. In other words a VM may be hibernated on given system and may subsequently be resumed on that system. At any time during a VM hibernation operation, whilst a VM is hibernated or during a VM resume operation, the encryption key history enables a change in the system encryption key. Any hibernated VM can subsequently be resumed and its encrypted data decrypted using the old key maintained in the encryption key history.

In a further embodiment of the invention an encryption key history is provided for use in a high availability VM arrangement where, for example, VMs are mirrored. In this embodiment, a VM running on system A is capable of performing a live failover to system B if a problem occurs on system A. The mirrored VM runs on system A and a dormant replica is provided on system B and synchronised via regular checkpoints with the VM on system A. When failover occurs the dormant VM on system B resumes execution at the last complete checkpoint. When the dormant VM was initially set up on system B, both systems A and B shared the same key encryption key. Changes to the system key on either system A or B are allowed along with the consequent re-encryption of the relevant data with the new key. This is possible because both systems A and B maintain a copy of the old key in the encryption key history. Therefore, when the VM fails over to system B the VM can decrypt its secure data with the old key maintained in the encryption history. In embodiments where changing the system key requires disrupting the VM in some way, for example, by powering off, then it is also possible to allow the pairing between the mirrored VMs to remain unbroken by letting both the live and dormant VM keep their data encrypted with the old key. This avoids tearing down the pairing, changing the system key on B and re-establishing the mirrored pair, and assumes that B hasn't discarded the old key used by the VM on system A.

In another embodiment, the VME is arranged to request all keys at once from the key history instead of requesting each key, testing the key and if necessary requesting a further key as described above.

In a further embodiment, the relevant key number for a migrated VM is not supplied to the target domain and the target domain interrogates the key history in accordance with a predetermined method.

In another embodiment, the availability of a key from the source domain is not verified in the target domain prior to an operation such as a migration as described above with reference to the pre-migration key hash check. In the present embodiment, the relevant key is assumed to be available in the target domain. As will be understood by those skilled in the art, this may result in the failure of the relevant operation if the key is not available and the decryption fails. In a further embodiment, instead of a key hash being provided to the target domain to establish whether or not a given key is available, a portion of encrypted test data is provided. Successful decryption of the test data by the target system indicates that it has access to the relevant key so that migration can proceed.

In another embodiment, each entry in the key history comprises a count of virtual machines using the relevant key. This count enables unused entries in the key history to be identified and removed either periodically or on the introduction of a new key when the key history is full. As will be understood by those skilled in the art, it is necessary to ensure that old keys are not marked unused until any migrating virtual machines using that key have successfully migrated.

As will be understood by those skilled in the art, any suitable way of maintaining usage information about old keys may be provided. For example, for each key in the key history a corresponding usage count or list of references to VMs that currently use the key may be provided. When space is required in the key history, for the insertion of a new key or as part of general key history maintenance or cleanup, the oldest key having a zero usage count or no list of references will be selected as the candidate for deletion.

As will be understood by those skilled in the art, any size of encryption key history may be provided. For finite key histories any key changes may be refused once the history is full. A full key history may be managed automatically in accordance with any suitable clean-up method or manually maintained by an administrator.

As will be understood by those skilled in the art, embodiments of the invention may be provided in any suitable VME or hypervisor. Such VMEs or hypervisors may be arranged to run directly on the relevant computer hardware or run within an installed operating system. Where a hypervisor run directly or natively on the computer hardware it effectively replaces the operating system, which is thus no longer required.

As will be understood by those skilled in the art, the inventory creation and pre-migration checks performed in embodiments of the invention described above with reference to FIGS. 5 and 6 are commonly performed when migrating VMs in VMEs. The functionality of the to invention may be incorporated with such standard pre-migration checks or be provided as a distinct function.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for migrating a virtual machine containing encrypted data from a source computer system to a target computer system, the method comprising the following actions each performed by at least one of the source computer system and the target computer system:
   maintaining, in said source computer system and said target computer system, a respective historical record of encryption keys used on said source computer system and said target computer system respectively, each historical record containing a respective temporally sequenced plurality of encryption keys and, for each encryption key of said temporally sequenced plurality of encryption keys, a respective usage count representing a respective number of virtual machines using the corresponding key;
   using the respective usage count of each key in the historical record to determine when to delete the corresponding key from the historical record in which it is contained;
   migrating data representing a first virtual machine of multiple virtual machines executing on said source computer system from said source computer system to said target computer system, said data including at least some data encrypted with a key of the plurality of keys in the historical record of encryption keys in said source computer system;
   adding a new encryption key to at least one of the historical record of encryption keys in said source computer system and the historical record of encryption keys in said target computer system, wherein said adding a new encryption key to at least one of the historical record of encryption keys is performed concurrently with said migrating data representing a first virtual machine; and
   determining, in said target computer system, a key from among the plurality of keys in said historical record of encryption keys in said target computer system to be used in decrypting the data representing said first virtual machine which is encrypted, and decrypting the data representing the first virtual machine which is encrypted using the key so determined.

2. The method according to claim 1 in which keys are maintained in each historical record up to a predetermined maximum number after which the oldest key is discarded in response to the storing of a new key.

3. The method according to claim 1, further comprising verifying that the key used to encrypt the data representing the first virtual machine is available in said target computer system before performing said migrating data representing a first virtual machine executing on said source computer system from said source computer system to said target computer system migrating.

4. The method according to claim 3, wherein verifying that the key used to encrypt the data representing the first virtual machine is available in said target system comprises transmitting a hashed value derived from said key from said source computer system to said target computer system, and verifying in the target system that the hashed value matches a key in its historical record.

5. The method according to claim 1, further comprising:
   determining in the target system whether the key used to encrypt data representing the first virtual machine is the most recent key in the historical record in said target system; and
   responsive to determining that the key used to encrypt the data representing the first virtual machine is not the most recent key, re-encrypting the data representing the first virtual machine using the most recent key in the historical record in said target system.

6. The method according to claim 1, wherein at least three keys are maintained simultaneously in said historical record.

7. A first computer system, comprising:
   a processor;
   a memory;
   an operating system which provides a platform for executing one or more application programs;
   a virtual machine environment application program executable on the first computer system, the virtual machine environment supporting concurrent execution of a plurality of virtual machines, and containing:

a first historical record of encryption keys used for encrypting data in at least one of said plurality of virtual machines said historical record containing a temporally sequenced plurality of encryption keys;

a respective secure data manager for each of at least one of said plurality of virtual machines, each secure data manager using at least one encryption key stored in said historical record to encrypt and decrypt data in the corresponding virtual machine; and a migration manager for migrating virtual machines between said first computer system and other computer systems, said migration manager performing a migration by:

receiving, from a second computer system acting as a source computer system, migrated data representing a first virtual machine executing on the second computer system, said migrated data including at least some data encrypted with a key of the plurality of keys in said first historical record of encryption keys;

wherein a new encryption key is added to at least one of (a) said first historical record of encryption keys, and (b) a second historical record of encryption keys in said second computer system, the new encryption key being added concurrently with said receiving, from the second computer system, migrated data representing a first virtual machine; and determining a key from among the plurality of keys in said first historical record of encryption keys to be used in decrypting the migrated data representing said first virtual machine which is encrypted, and decrypting the migrated data representing the first virtual machine which is encrypted using the key so determined.

8. The computer system according to claim 7 in which keys are maintained in said first historical record up to a predetermined maximum number after which the oldest key is discarded in response to the storing of a new key.

9. The computer system according to claim 7, wherein the migration manager further performs: verifying that the key used to encrypt the data representing the first virtual machine is available in said computer system responsive to a request from the source computer system before receiving the migrated data representing a first virtual machine.

10. The computer system according to claim 9, wherein verifying that the key used to encrypt the data representing the first virtual machine is available in said system comprises receiving a hashed value derived from said key from said source computer system, and verifying that the hashed value matches a key in said first historical record.

11. The computer system according to claim 7, wherein the migration manager further performs:

determining in said computer system whether the key used to encrypt data representing the first virtual machine is the most recent key in said first historical record; and responsive to determining that the key used to encrypt the data representing the first virtual machine is not the most recent key, re-encrypting the data representing the first virtual machine using the most recent key in said first historical record.

12. The computer system according to claim 7, wherein at least three keys are maintained simultaneously in said historical record.

\* \* \* \* \*